United States Patent [19]

Landa

[11] 4,364,460
[45] Dec. 21, 1982

[54] ELECTROMAGNETIC HELICAL SPRING CLUTCH

[75] Inventor: Benzion Landa, Alberta, Canada

[73] Assignee: Savin Corporation, Valhalla, N.Y.

[21] Appl. No.: 167,461

[22] Filed: Jul. 11, 1980

[51] Int. Cl.³ .............................................. F16D 27/10
[52] U.S. Cl. .................................... 192/35; 192/81 C; 192/84 T
[58] Field of Search ............... 192/84 T, 84 PM, 84 E, 192/81 C, 35, 21.5, 21

[56] References Cited

U.S. PATENT DOCUMENTS

| | | | |
|---|---|---|---|
| 3,349,880 | 10/1967 | Baer | 192/84 T |
| 3,974,902 | 8/1976 | Wahlstedt | 192/84 T |
| 4,326,613 | 4/1982 | Houlberg | 192/21 |

*Primary Examiner*—George H. Krizmanich
*Attorney, Agent, or Firm*—Shenier & O'Connor

[57] ABSTRACT

A magnetically actuated clutch in which a helical spring is carried by an input clutch member with portions surrounding a relatively rotatable output clutch member. An electromagnet is positioned with its poles lightly engaging the surrounding spring portions at circumferentially spaced locations, while either the spring or the output clutch member or both are formed of a magnetically permeable material to complete a magnetic circuit. Energizing the electromagnet causes the poles to clamp the spring to retard its rotation with the input member, thereby causing the spring to wrap down on the output clutch member and engage the clutch.

9 Claims, 2 Drawing Figures

ELECTROMAGNETIC HELICAL SPRING CLUTCH

BACKGROUND OF THE INVENTION

Various types of electromagnetically actuated clutches for transmitting rotary motion are known in the art. In one type of magnetically actuated clutch, disclosed, for example, in Lowery et al U.S. Pat. No. 4,030,584 and Baer U.S. Pat. No. 3,349,880, a helical clutch spring carried by an input or driver clutch member with portions loosely surrounding an output or driven clutch member has its free end attached to the armature of a magnetic circuit. Energization of an annular coil surrounding the clutch assembly pulls the armature against a flange on the output member in Lowery et al and against a stationary friction surface in Baer to retard the armature to cause the spring to wrap down on and engage the output member. Owing to the complexity of construction of clutches of this type, they are relatively expensive.

In another type of magnetically actuated clutch known in the art, such as disclosed in Wahlstedt et al U.S. Pat. No. 3,974,902, Baer et al U.S. Pat. No. 3,682,622, or Mason U.S. Pat. No. 3,177,995, the free end of the clutch spring, which is formed of magnetic material, is disposed in the gap of a radially symmetric magnetic circuit controlled by an annular coil surrounding the clutch assembly. Energization of the magnetic coil draws the free end of the clutch spring toward a relatively moving magnetic core portion to cause the spring to wrap down on the other clutch member. While clutches of this type do not require separate armatures such as described above, their magnetic circuits nevertheless add appreciably to the bulk and complexity of the overall clutch assembly. In addition, these clutches require a clutch spring formed of a magnetically permeable material.

SUMMARY OF THE INVENTION

One of the objects of my invention is to provide a helical spring clutch which may be actuated electrically.

Another object of my invention is to provide an electromagnetic helical spring clutch which is simple and inexpensive.

Still another object of my invention is to provide an electromagnetic helical spring clutch which operates reliably even after a long period of use.

A further object of my invention is to provide an electromagnetic helical spring clutch which does not require either a coaxial armature or a clutch spring formed of a magnetically permeable material.

Other and further objects will be apparent from the following description.

In general, my invention contemplates a magnetically actuated clutch in which a helical spring is carried by an input clutch member with portions surrounding a relatively rotatable output clutch member. An electromagnet is positioned with its poles adjacent to the surrounding spring portions at circumferentially spaced locations, while either the spring or the output clutch member or both are formed of a magnetically permeable material to complete a magnetic circuit. Energizing the electromagnet causes the poles to clamp the spring to retard its rotation with the input member, thereby causing the spring to wrap down on the output clutch member and engage the clutch. Preferably, the electromagnet is mounted for movement in the direction of the adjacent spring portions while being prevented from moving more than a predetermined distance for those spring portions.

Since my clutch uses angularly or circumferentially spaced poles rather than radially symmetric poles as the prior art, the resulting assembly is simpler and more compact in construction and less expensive. Further, since I am able to clamp the clutch spring simply by sandwiching it between the relatively movable magnet and an output clutch member of magnetic material, I need not use a clutch spring formed of a magnetically permeable material.

BRIEF DESCRIPTION OF THE DRAWINGS

In the accompanying drawings to which reference is made in the instant specification and in which like reference characters are used to indicate like parts in the various views.

DESCRIPTION OF THE PREFERRED EMBODIMENT

Figure 1:
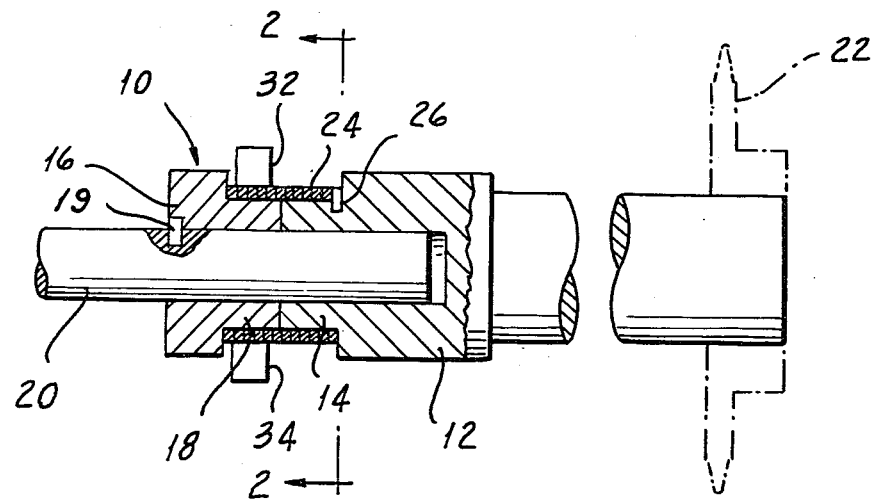
FIG. 1 is a fragmentary side elevation of an electromagnetically actuated clutch constructed according to my invention, with parts shown in section.

Referring now to the drawings, my helical spring clutch, indicated generally by the reference numeral 10, includes an input member 12 and a coaxial output member 16 which is supported on an output shaft 20. A key 19 or the like fixes the angular position of member 16 on shaft 20. Input member 12 may be driven by any suitable means, such as by a sprocket wheel 22, shown in phantom in FIG. 1. A helical spring 24 wrapped around reduced portions 14 and 18 of members 12 and 16 is secured at one end by means of an inwardly extending tang 26 to the input member 12, but is free at the end adjacent to the output member 16. As is apparent to those skilled in the art, other means for securing the driven end of spring 24 to member 12, such as a clip or the like (not shown), could also be used. It will be appreciated that so long as the end of the spring 24 adjacent to member 16 is free, no clutching action takes place so that member 16 will not rotate with member 12.

Figure 2:
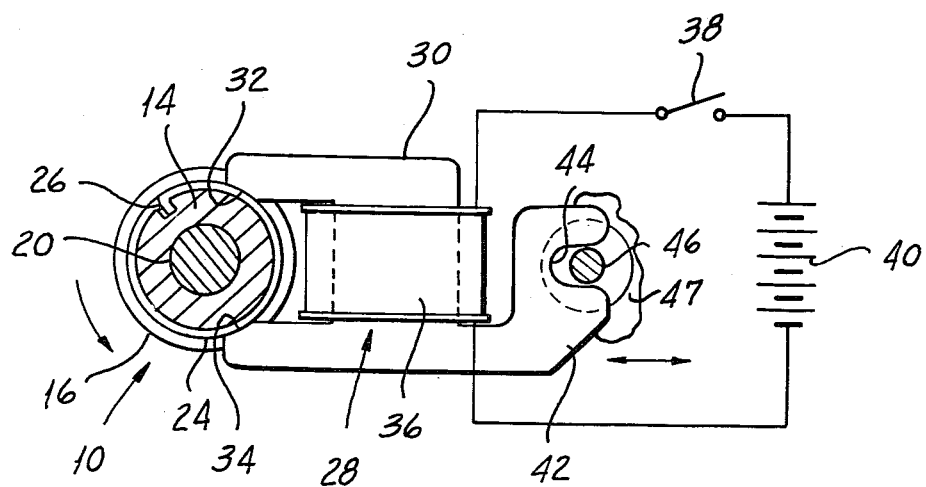
FIG. 2 is a section of the apparatus shown in FIG. 1 taken along line 2—2 thereof.

I control clutch 10 by means of an electromagnet indicated generally by the reference numeral 28. Electromagnet 28 comprises a horseshoe-shaped core 30 having pole pieces 32 and 34 the ends of which are shaped to ride on a portion of spring 24 surrounding member 16, preferably on the end coils remote from member 12. While I show the electromagnet 28 in FIGS. 1 and 2 as being horizontally spaced from clutch 10, the particular orientation of the magnet 28 is not critical. A winding 36 around core 30 is coupled to a suitable current source 40 through a normally open switch 38. Electromagnet 28 includes an extension 42 formed with a slot 44 extending generally in a direction perpendicular to the axis of shaft 20. Slot 44 receives the reduced portion of a stationary pin 46 to support the electromagnet 28 on a frame member 47, for example, for movement toward and away from shaft 20. Pin 46 maintains the electromagnet 28 sufficiently near spring clutch 10 to permit the magnet to be drawn in when energized. At the same time, pin 46 allows the pole portions 32 and 34 of the core 30 to ride loosely on the spring 24. The spring 24 or the output member 16, or, preferably, both are formed of a magnetic material. Preferably, the coils of spring 24 are formed with a rectangular cross section to ensure an even wear pattern.

Spring 24 is so dimensioned as to fit relatively loosely around the reduced portion 18 of output member 16 so that the spring slips relative to the output member while the magnet 28 is unenergized. In response to energizing of the magnet 28 upon closing the switch 38, the pole portions 32 and 34 of the core 22 are attracted to the adjacent portions of the spring 24, either through magnetization of the spring itself or through magnetization of the adjacent portion of member 16, thereby exerting a frictional drag force on the spring tending to oppose its rotation with member 12. As a result, the adjacent portions of spring 24 wrap down on output member 16, coupling the members 12 and 16.

It will be seen that I have accomplished the objects of my invention. My clutch may be actuated electrically and is simple and inexpensive. My clutch operates reliably even after a long period of use, and does not require a clutch spring formed of a magnetically permeable material.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A magnetically actuated clutch assembly including in combination a first clutch member, a second clutch member, said first and second clutch members being supported for rotary movement around a common axis, a helical spring, means for securing one end of said spring to said first clutch member for rotation therewith around said axis, a portion of said spring having a free end surrounding said second clutch member, the arrangement being such that said spring portion rotates relative to said second clutch member in the absence of a restraint against the movement of said free end, one of said spring and said second member being formed of magnetic material, an electromagnet comprising a pair of pole pieces of opposite polarity, means mounting said electromagnet for movement toward said second clutch member with said pole pieces adjacent said surrounding spring portion, a coil carried by said electromagnet, and means for energizing said coil to cause said pole pieces to move toward said second clutch member to exert a retarding force on said free end.

2. A magnetically actuated clutch assembly including in combination a first clutch member, a second clutch member, said first and second clutch members being supported for rotary movement around a common axis, a helical spring having a rectangular coil cross section, means for securing one end of said spring to said first clutch member for rotation therewith around said axis, a portion of said spring having a free end surrounding said second clutch member, the arrangement being such that said spring portion rotates relative to said second clutch member in the absence of a restraint against the movement of said free end, one of said spring and said second member being formed of magnetic material, a U-shaped armature of magnetic material having a base and a pair of legs forming pole pieces, said legs having end portions shaped to match the curvature of said spring, means mounting said armature for movement toward said second clutch member with said legs adjacent said surrounding spring portion, a coil carried by said base, and means for energizing said coil to cause said legs to move toward said second clutch member to exert a retarding force on said free end.

3. A magnetically actuated clutch assembly including in combination a first clutch member, a second clutch member comprising a magnetic material, said first and second clutch members being supported for rotary movement around a common axis, a helical spring, means for securing one end of said spring to said first clutch member for rotation therewith around said axis, a portion of said spring having a free end surrounding said second clutch member, the arrangement being such that said spring portion rotates relative to said second clutch member in the absence of a restraint against the movement of said free end, one of said spring and said second member being formed of magnetic material, a U-shaped armature of magnetic material having a base and a pair of legs forming pole pieces, means mounting said armature for movement toward said second clutch member with said legs adjacent said surrounding spring portion, a coil carried by said base, and means for energizing said coil to cause said legs to move toward said second clutch member to exert a retarding force on said free end.

4. A clutch including in combination first and second rotary clutch members, a helical spring secured to said first member with a portion of said spring surrounding said second member, said spring portion being free to rotate relative to said second member in the absence of a retarding force on said spring portion, at least one of said spring and said second member comprising a magnetic material, an electromagnet having a pair of pole pieces of opposite polarity, said electromagnet being formed with portions defining a slot, means including a pin engaging said slot for supporting said electromagnet for movement toward said second member with said pole pieces adjacent said surrounding spring portion, and means for energizing said electromagnet to cause said pole pieces to move toward said second clutch member to exert a retarding force on said surrounding spring portion.

5. A clutch including in combination first and second rotary clutch members, a helical spring secured to said first member with a portion of said spring surrounding said second member, said spring portion being free to rotate relative to said second member in the absence of a retarding force on said spring portion, at least one of said spring and said second member comprising a magnetic material, an electromagnet having a pair of pole pieces of opposite polarity, means for supporting said electromagnet for movement toward said second member with said pole pieces adjacent said surrounding spring portion while preventing the movement of said electromagnet more than a predetermined distance away from said second member, and means for energizing said electromagnet to cause said pole pieces to move toward said second clutch member to exert a retarding force on said surrounding spring portion.

6. A clutch including in combination first and second rotary clutch members, a helical spring secured to said first member with a portion of said spring surrounding said second member, said spring portion being free to rotate relative to said second member in the absence of a retarding force on said spring portion, at least one of said spring and said second member comprising a magnetic material, an electromagnet having a pair of pole pieces of opposite polarity, means for supporting said electromagnet for movement toward said second member with said pole pieces adjacent said surrounding spring portion, and means for energizing said electromagnet to cause said pole pieces to move toward said second clutch member to exert a retarding force on said surrounding spring portion.

7. A clutch including in combination first and second rotary clutch members, a helical spring secured to said first member with a portion of said spring surrounding said second member, said spring portion being free to rotate relative to said second member in the absence of a retarding force on said spring portion, at least one of said spring and said second member comprising a magnetic material, an electromagnet having a pair of pole pieces of opposite polarity, means for supporting said electromagnet for movement toward said second member with said pole pieces adjacent said surrounding spring portion at locations spaced circumferentially about said spring portion, and means for energizing said electromagnet to cause said pole pieces to move toward said second clutch member to exert a retarding force on said surrounding spring portion.

8. A magnetically actuated clutch including in combination first and second rotary clutch members, a helical spring secured to said first member with a portion of said spring surrounding said second member, said spring portion being free to rotate relative to said second member in the absence of a retarding force on said spring portion, at least one of said spring and said second member comprising a magnetic material, means including a pair of pole pieces of opposite polarity disposed adjacent said surrounding spring portion at locations spaced circumferentially about said spring portion for forming a magnetic circuit with said magnetic material, at least one of said pole pieces being movable toward said second member, and means for energizing said magnetic circuit to cause said one pole piece to move toward second clutch member to exert a retarding force on said surrounding spring portion.

9. A magnetically actuated clutch including in combination first and second rotary clutch members, a helical spring secured to said first member with a portion of said spring surrounding said second member, said spring portion being free to rotate relative to said second member in the absence of a retarding force on said spring portion, at least one of said spring and said second member comprising a magnetic material, means including a pole piece movable toward said surrounding spring portion and said second member for forming a magnetic circuit with said magnetic material, and means for energizing said magnetic circuit to cause said pole piece to move toward said second clutch member to exert a retarding force on said surrounding spring portion.

* * * * *